United States Patent [19]
Jordan

[11] Patent Number: 5,911,071
[45] Date of Patent: Jun. 8, 1999

[54] PERSISTENT PROGRAMMING SYSTEM AND METHOD FOR DEPLOYING SELF-CONTAINING EXECUTABLE APPLICATIONS

[75] Inventor: Michael J. Jordan, Palo Alto, Calif.

[73] Assignee: Sun Microsystems, Inc., Palo Alto, Calif.

[21] Appl. No.: 08/713,391

[22] Filed: Sep. 13, 1996

[51] Int. Cl.$^6$ .................................................. G06F 9/45
[52] U.S. Cl. .......................... 395/701; 395/705; 395/702; 395/683; 707/103
[58] Field of Search .................................... 395/701, 702, 395/705, 712, 704, 652, 682, 683, 685; 380/4, 3, 25, 49; 707/103, 104

[56] References Cited

U.S. PATENT DOCUMENTS

| | | | |
|---|---|---|---|
| 5,367,686 | 11/1994 | Fisher et al. ............................ | 395/712 |
| 5,430,836 | 7/1995 | Wolf et al. ............................... | 345/335 |
| 5,615,362 | 3/1997 | Jensen et al. ............................ | 707/103 |
| 5,727,203 | 3/1998 | Hapner et al. .......................... | 707/103 |

FOREIGN PATENT DOCUMENTS

| | | |
|---|---|---|
| 0 423 937 | 4/1991 | European Pat. Off. . |
| 789 300 A2 | 8/1997 | European Pat. Off. . |

OTHER PUBLICATIONS

Mick Jordan, "Early Experiences with Persistent Java," First International Workshop on Persistence for Java, Scotland, Sep. 16–18, 1996, Sun Microsystems Laboratories, Mountain View, CA, pp. 1–9.

Atkinson et al, "Design Issues for Persistent Java: a type–safe, object–oriented, orthogonally persistent system," Proceedings of the 7th Intl. Conf. on Persistent Object Systems, Cape May, NJ, USA, May 1996.

Santos et al, "Persistent Java," Proceedings of the First International Workshop on Persistence and Java (PJ1), Sponsored by Sun Microsystems, Drymen, Scotland, Sep. 1996.

Kaplan et al, "Our SPIN on Persistent Java: The JavaSPIN Approach," Proceedings of the First International Workshop on Persistence and Java (PJ1), Sponsored by Sun Microsystems, Sep. 1996.

Susan Spence, "Distribution Strategies for Persistent Java," Proceedings of the First Intl Workshop on Persistence and Java (PJ1), Sponsored by Sun Microsystems, Sep. 1996.

Olivier Gruber, "Transparent Access to Legacy Data in Java," Proceedings of the PJ1, Sponsored by Sun Microsystems, Sep. 1996.

Moss et al, "Approaches to Adding Persistence to Java," Proceedings of the PJ1, Sponsored by Sun Microsystems, Sep. 1996.

Laurent Daynes, "Extensible Transaction Management in PJava," Proceedings of the PJ1, Sponsored by Sun Microsystems, Sep. 1996.

Dearle et al, "Persistent Operating System Support for Java," Proceedings of the PJ1, Sponsored by Sun Microsystems, Sep. 1996.

(List continued on next page.)

*Primary Examiner*—Tariq R. Hafiz
*Assistant Examiner*—Tuan Q. Dam
*Attorney, Agent, or Firm*—Finnegan, Henderson, Farabow, Garrett & Dunner, L.L.P.

[57] ABSTRACT

The invention creates a self-contained executable application. A compiler compiles an application including main source code and initialization code to generate a list of objects needed for execution of the application. A processing device executes the compiled application to cause the initialization code to load the listed objects as persistent objects into a single persistent store. The processing device then stabilizes the persistent store to create the self-contained executable application which appears to a user as a single executable file.

27 Claims, 4 Drawing Sheets

OTHER PUBLICATIONS

R. Morrison et al., "Exploiting Persistent Linkage in Software Engineering Environments," School of Mathematical and Computational Sciences, University of St. Andrews, 1995, pp. 1–23.

Madany et al, "Organizing and Typing Persistent Objects within an Object–Oriented Framework," Proceedings of the 25th Hawaii Intl. Conf. on System Sciences, ACM, IEEE, pp. 800–809, Kauai, HI, USA, Jan. 1992.

Morrison et al, "Language Design Issues in Supporting Process–Oriented Computation in Persistent Environments," ACM Conference Paper, pp. 736–744, Kailua–Kona, HI, USA, Jan. 1989.

PERSISTENT PROGRAMMING SYSTEM AND METHOD FOR DEPLOYING SELF-CONTAINING EXECUTABLE APPLICATIONS

BACKGROUND OF THE INVENTION

The present invention is directed generally to a system and method using persistent programming to deploy self-contained, executable applications, and more specifically to a system and method for encapsulating an application such that it appears to a user as a single executable file.

As computers become more powerful, software applications provide more functionality and thus become more complex. Current mechanisms for deploying applications are complex, typically involving installing multiple files on the machine on which the application is deployed. Removing the application or installing a new version is a complex task and typically prone to errors.

The process of installing an application involves physically transferring specific application components, ensuring the consistency of the complete set of components, and, perhaps, capturing the locations of the components for a subsequent uninstallation.

Current practice normally handles physical transferring of application components by bundling the components as a separate file or package and extracting them at the destination. This latter step involves storing the extracted components as individual files, and is done either explicitly by the extraction or under the control of an installation program. Some programming systems, particularly those operating on PC platforms, bundle the components into an executable program that is simply executed to achieve both steps. Other programming systems, such as Java, dynamically load the application components at run time.

Once installed as a collection of individual files, inconsistencies may develop, particularly if components are shared between applications, or if the component files can be manipulated directly outside the control of the application. Some systems, for example, permit configuration files including user-customization data (e.g., screen colors) and application-state data to be manipulated outside the control of the application. Such manipulation may cause data inconsistencies.

Other systems, such as MacOS®, manage inconsistencies by collecting the code and data for an application into a single file. Still other systems, such as Solaris®, manage inconsistencies by recording dependencies between software components.

At some point after an application has been installed, a user may wish to remove or upgrade it. Removing applications or upgrading to a new version requires knowing the location of the component files. Some installation programs create an uninstall program at installation time to facilitate removal of the application.

None of the conventional systems, however, provides complete application consistency or persistence of the application's components. Therefore, a need exists for maintaining the consistency of the application components while assisting installation, manipulation, and removal of the application.

SUMMARY OF THE INVENTION

The present invention addresses this need by encapsulating the application components as persistent objects in a single, executable persistent store using a persistent programming system.

In accordance with the purpose of the invention as embodied and broadly described herein, the present invention includes an encapsulation system and method that create a self-contained executable application. A compiler compiles an application including main source code and initialization code to generate a list of objects needed for execution of the application. A processing device executes the compiled application to cause the initialization code to load the listed objects as persistent objects into a single persistent store. The processing device stabilizes the persistent store to create the self-contained executable application which appears to a user as a single executable file.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DETAILED DESCRIPTION OF THE PREFERRED EMBODIMENTS

The following detailed description of the invention refers to the accompanying drawings that illustrate preferred embodiments of the invention. Other embodiments are possible and changes may be made to the embodiments without departing from the spirit and scope of the invention. The following detailed description is, therefore, not to be considered as limiting the invention. The scope of the invention is defined only by the appended claims.

The present invention encapsulates an application's components, including all the code, configuration data, resources, etc., in a single persistent store, such that the application appears to a user as a single executable file.

Figure 1:
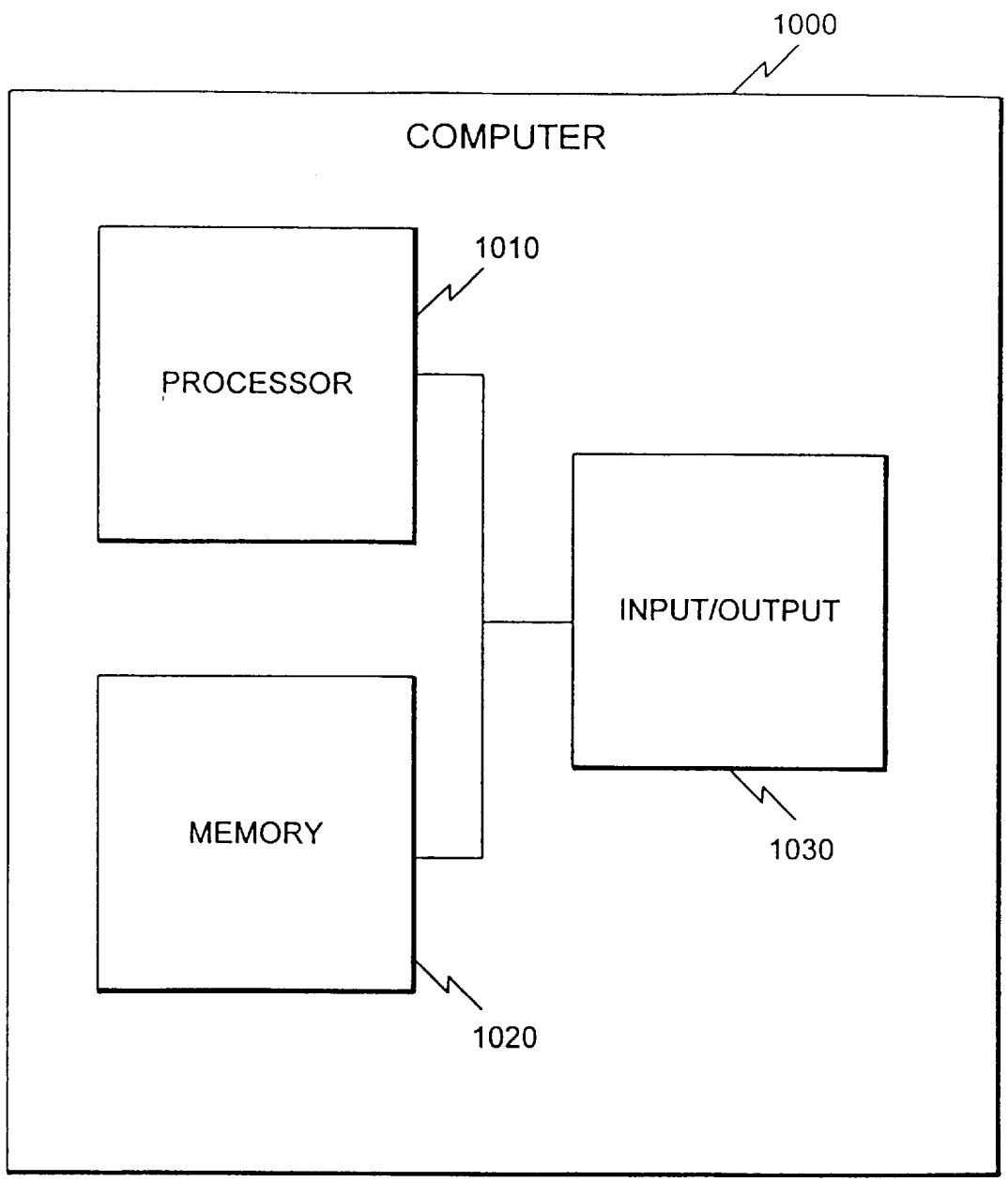
FIG. 1 is a block diagram of a computer implementing the encapsulation method of the present invention.

FIG. 1 shows a computer 1000 implementing the present invention. Computer 1000 includes processor 1010, memory 1020, and input/output 1030. Processor 1010 may be any type of processor that executes software applications. Processor 1010 operates using a persistent programming language, preferably the Persistent Java (PJava) programming language. PJava, an offspring of Java, provides orthogonal persistence for Java, meaning that all objects, no matter what their type, have equal rights to persistence including, longevity and brevity. PJava is described in an article by Michael J. Jordan entitled "Early Experiences with Persistent Java," First International Workshop on Persistence for Java, Sep. 16–18, 1996, which is hereby incorporated by reference.

Memory 1020 includes ROM, RAM, optical disks, etc. for storing the operating code and application software executed by processor 1010, and any data needed for their execution. Input/output 1030 includes a keyboard, a mouse, a monitor, a modem, various disk drives, etc. for permitting communication between computer 1000 and a user or another computer.

Figure 2:
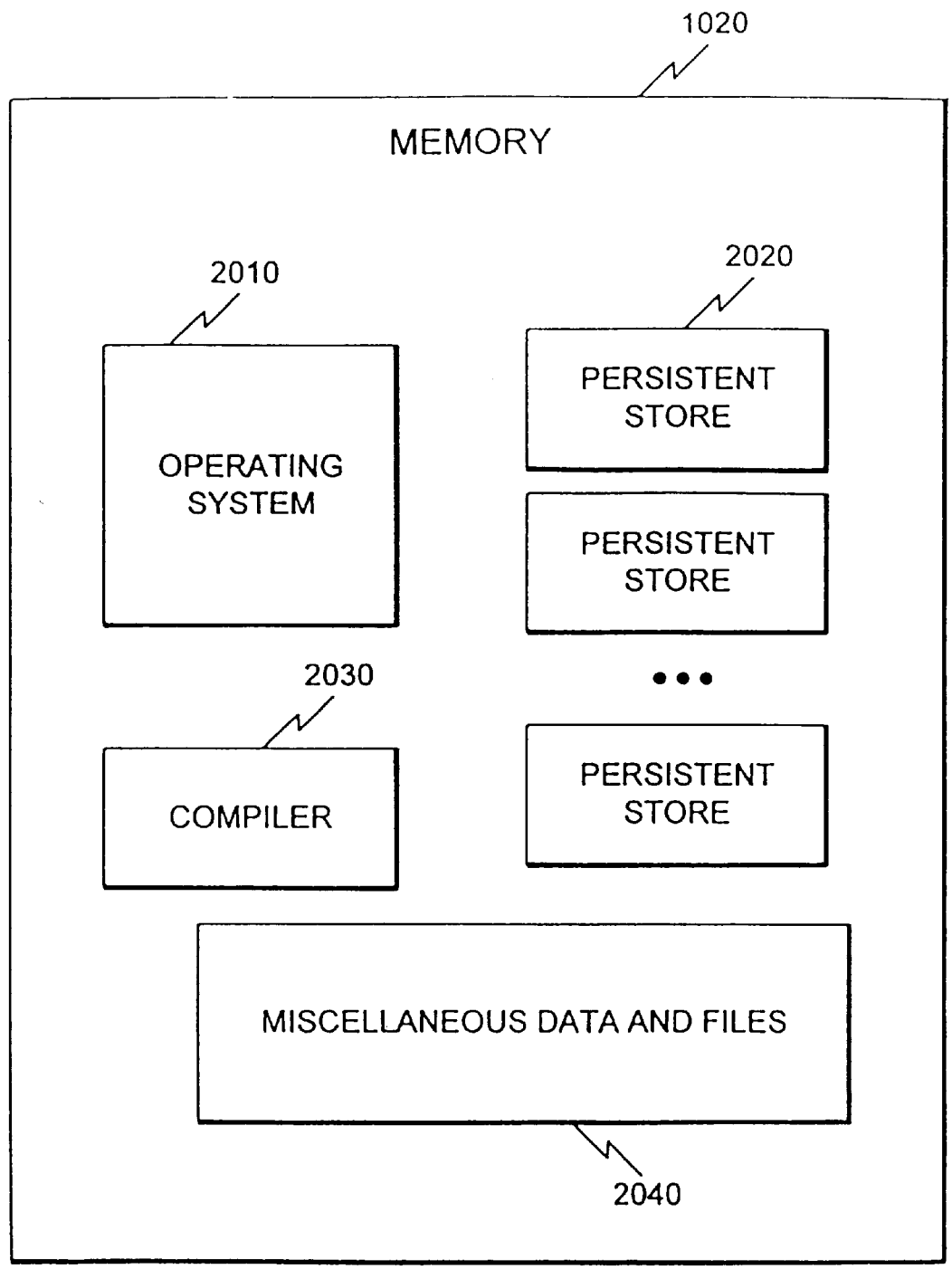
FIG. 2 shows the contents of the memory shown in FIG. 1.

FIG. 2 shows the contents of memory 1020. Memory 1020 preferably includes operating system 2010, one or more persistent stores 2020, compiler program 2030, and miscellaneous data and files 2040. Operating system 2010 controls the operation of computer 1000, and compiler 2030 compiles source code into object code as is commonly known in the art. Persistent stores 2020 are executable self-contained applications. A persistent store, according to the present invention, is a single, protected entity containing persistently bound data and code of the application.

Figure 3:
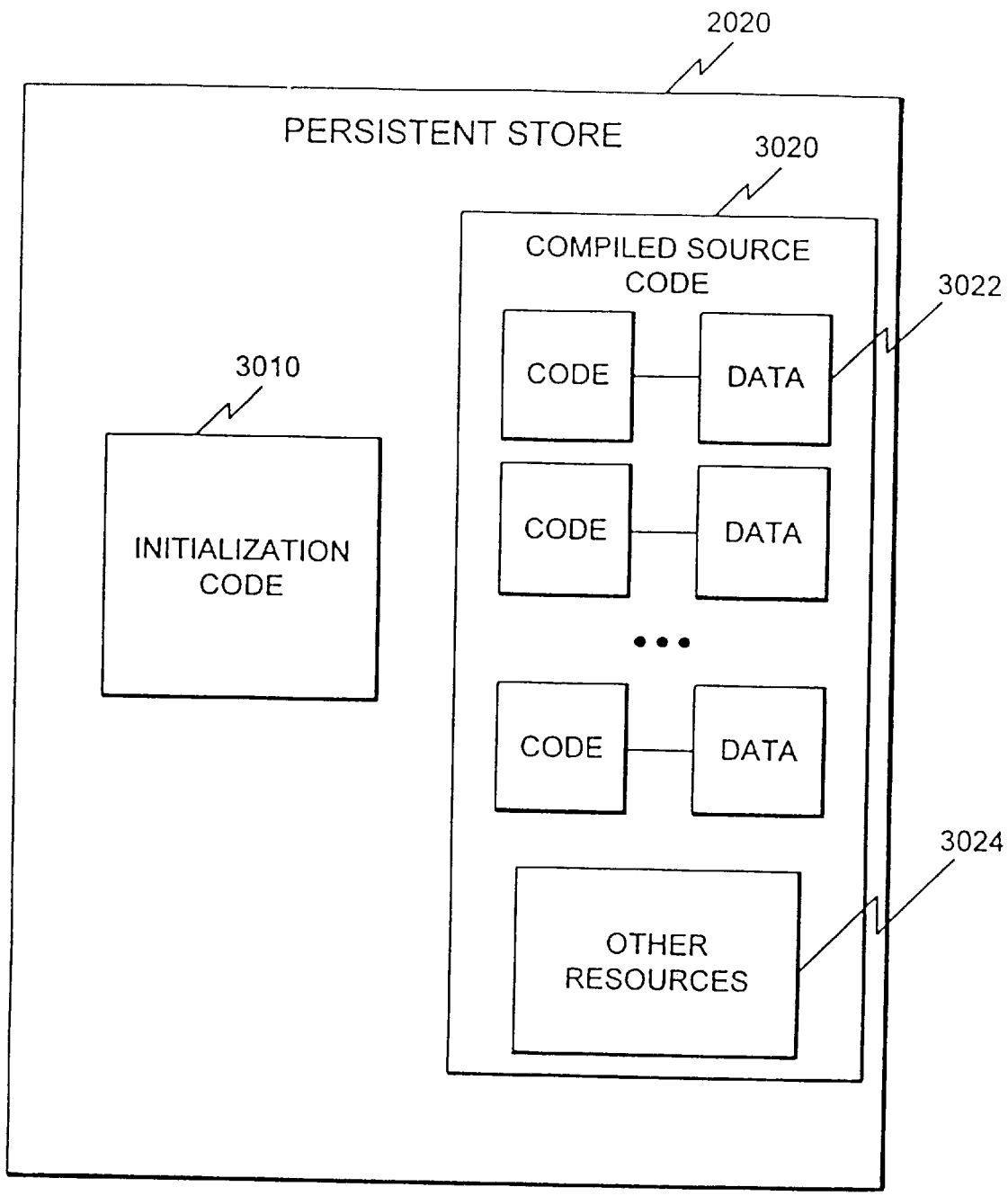
FIG. 3 shows the contents of a persistent store shown in FIG. 2.

FIG. 3 shows persistent store 2020 in more detail. Persistent store 2020 preferably includes initialization code 3010 and compiled source code 3020. Compiled source code 3020 includes persistently bound code and data 3022 and other various resources 3024 needed for execution of the application. Initialization code 3010 will be described below with respect to FIG. 4.

Figure 4:
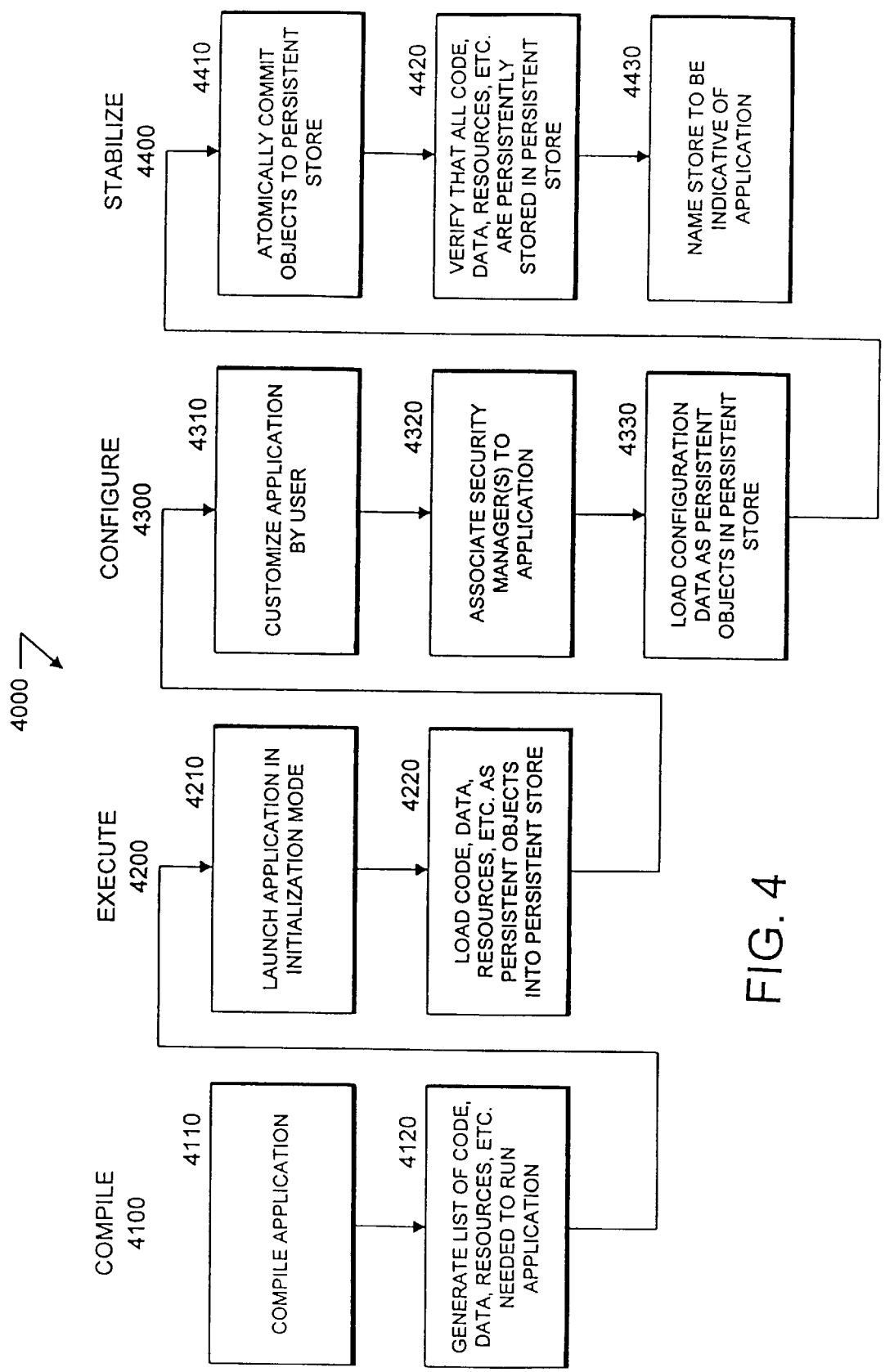
FIG. 4 is a flowchart illustrating a preferred implementation of the encapsulation method of the present invention.

FIG. 4 is a flow chart of a procedure 4000 for encapsulating an application according to this invention. Encapsulation procedure 4000 includes four logical groups of steps: compile 4100, execute 4200, configure 4300, and stabilize 4400.

Encapsulation procedure 4000 begins with compiler 2030 compiling the application [step 4110]. Preferably, compiler 2030, such as a Java compiler, generates a list of objects (e.g., code, data, resources, etc.) needed to run the application [step 4120].

From the perspective of determining the set of needed objects, applications fall into one of three categories: (1) those for which the set of needed objects can be determined statically by examining the source code; (2) those which dynamically choose the needed objects from a fixed, statically determined set at run time; and (3) a variant of the second category in which the set of loadable objects is open-ended and the objects have dynamically generated names.

The vast majority of applications fall into the first category and a small number fall into the second. An example of the third category is a highly integrated program development environment that compiles and loads newly created source code into the same virtual machine as the environment itself.

Precisely determining the set of objects in the first category requires an analysis similar to that performed by a Java compiler. The Java compiler records the relevant information in an object file generated by the compiler. The set of objects reachable from one or more root objects can be determined at application build time by a transitive closure process. The Java compiler's ability to specify other objects as roots supports those applications that generate object names dynamically, such as those applications in the third category.

In an alternative embodiment, only root objects, typically the ones containing a main method of the application, are identified, and instances of these objects are created and made persistent in an application initialization mode (to be discussed below).

After generating the list of needed objects, processor 1010 launches the compiled application into the initialization mode [step 4210] discussed above. In the preferred embodiment, the initialization code is separate from the main source code, as shown in FIG. 3. Upon execution of the application, processor 1010 invokes the appropriate code depending on the mode of operation. Alternatively, the initialization mode may be launched by a command-line or screen dialog argument. This latter method, however, does not provide the clean separation of the initialization code from the main source code as in the former method.

Executing the initialization code forces all needed objects into one of the persistent stores 2020 [step 4220]. In the alternative embodiment discussed above, where an instance of a root object is created and made persistent in the application initialization mode, processor 1010 exercises a feature of PJava that forces all objects referenced by the identified root objects to be transitively loaded.

After all the needed objects have been loaded into persistent store 2020, the application may be configured. For example, a user may customize the application [step 4310] via a graphic user interface (GUI). Customization might include changing the screen colors.

Additionally, the user might associate one or more security managers with the application, a feature permitted by PJava. The security manager permanently controls the kinds of access users are permitted. The configuration data need not include only customization data or security managers, but may also include application state data for use in recovery upon a restart.

Processor 1010 loads this configuration data into persistent store 2020 as a persistent object [step 4330]. Since the configuration data is persistently stored in persistent store 2020, the application controls all access to it, thereby eliminating any inconsistency between the configuration data and the code that manipulated it.

After loading the needed objects and the configuration data into persistent store 2020, processor 1010 stabilizes persistent store 2020, using the stabilization feature of PJava which atomically commits the objects to the store [step 4410]. Processor 1010 then verifies and optimizes the objects in persistent store 2020 [step 4420]. The persistent store should finally be given a name indicative of the application [step 4430] to facilitate identification by a user. The application resides in a single, protected, executable entity and appears to the user as an ordinary executable file.

The present invention has the following advantages over conventional systems:

(1) The application objects cannot become inconsistent because all the objects (including both code and data) are persistently stored in a single store. Furthermore, because the configuration data is also contained in this single store, as PJava objects, it cannot become inconsistent with the code that manipulated it.

(2) Locating the objects is easy because all of the objects are persistently bound and physically located in the same store.

(3) Removing the application entails simply deleting the store. A new version of the application may be deployed either by completely replacing the existing store, or by applying an evolution tool to the store. Because Java provides full type information for all objects, the code may be incrementally updated and the configuration data may be reliably and easily migrated.

The foregoing description of preferred embodiments of the present invention has been presented for purposes of illustration and description. It is not intended to be exhaustive or to limit the invention to the precise form disclosed, and modifications and variations are possible in light of the above teachings or may be acquired from practice of the invention. For example, the computer executing the encapsulation method of the present invention need not operate using the PJava programming language, but may alternatively operate using another persistent programming language. The scope of the invention is defined by the claims and their equivalents.

What is claimed is:

1. A method of creating a self-contained executable application comprising the steps of:

compiling an application including main source code and initialization code to generate a list of objects needed for execution of the application;

loading the compiled source code into a single persistent store;

executing the compiled initialization code to load the listed objects as persistent objects into the persistent store; and stabilizing the persistent store to create the self-contained executable application.

2. The method of claim 1, further comprising the step of configuring the application by permitting a user to enter customization data to customize the application.

3. The method of claim 2, wherein the configuring step includes the substep of associating a security manager to the application.

4. The method of claim 3, wherein the configuring step further includes the substep of loading the customization data and security manager as persistent objects into the persistent store.

5. The method of claim 2, wherein the configuring step includes the substep of loading the customization data as persistent objects into the persistent store.

6. The method of claim 1, wherein the stabilizing step comprises the substeps of atomically committing the listed objects to the persistent store; and verifying that all the objects are persistently stored in the persistent store.

7. The method of claim 1, further comprising the steps of associating a security manager to the application; and loading the security manager as a persistent object into the persistent store.

8. The method of claim 1, further comprising the steps of recording a state of the application; and loading the application state as a persistent object into the persistent store.

9. A computer readable medium configured to store instructions to create a self-contained executable application, the instructions being capable of causing a computer to perform the steps of:

generating a list of objects needed for execution of an application including initialization code and main source code;

loading the source code into a single persistent store;

executing the initialization code to load the listed objects as persistent objects into the persistent store; and stabilizing the persistent store to create the self-contained executable application.

10. The computer readable medium of claim 9, wherein the instructions further being capable of causing the computer to perform the step of configuring the application by permitting a user to enter customization data to customize the application.

11. The computer readable medium of claim 10, wherein the configuring step comprises the substep of associating a security manager to the application.

12. The computer readable medium of claim 11, wherein the configuring step further comprises the substep of loading the customization data and the security manager as persistent objects into the persistent store.

13. The computer readable medium of claim 11, wherein the configuring step comprises the substep of loading the customization data as persistent objects into the persistent store.

14. The computer readable medium of claim 9, wherein the stabilizing step comprises the substeps of atomically committing the listed objects to the persistent store; and verifying that all the objects are persistently stored in the persistent store.

15. The computer readable medium of claim 9, wherein the instructions further being capable of causing the computer to perform the steps of associating a security manager to the application; and loading the security manager as a persistent object into the persistent store.

16. The computer readable medium of claim 9, wherein the instructions further being capable of causing the computer to perform the steps of recording a state of the application; and loading the application state as a persistent object into the persistent store.

17. A system to create a self-contained executable application comprising:

a compiler configured to compile an application including initialization code and main source code and to generate a list of objects needed for execution of the application;

a memory device configured to store a persistent store;

a processing device connected to the compiler and the memory device and configured to load the compiled source code into the persistent store, to execute the compiled initialization code to load the listed objects as persistent objects into the persistent store, and to stabilize the persistent store to create the self-contained executable application.

18. The system of claim 17, further comprising a configuration device configured to permit a user to enter customization data to customize the application.

19. The system of claim 18, wherein the configuration device includes an association device configured to associate a security manager to the application.

20. The system of claim 19, wherein the configuration device comprises a loading device configured to load the customization data and the security manager as persistent objects into the persistent store.

21. The system of claim 18, wherein the configuration device comprises a loading device configured to load the customization data as persistent objects into the persistent store.

22. The system of claim 17, wherein the processing device comprises a stabilizer configured to atomically commit the listed objects to the persistent store, and to verify that all the objects are persistently stored in the persistent store.

23. The system of claim 17, further comprising an association device configured to associate a security manager to the application; and a loading device configured to load the security manager as a persistent object into the persistent store.

24. The system of claim 17, further comprising a recording device configured to record a state of the application; and a loading device configured to load the application state as a persistent object into the persistent store.

25. A self-contained, computer executable application stored on a storage medium comprising:

persistent code objects comprising all compiled source code needed for execution of the application;

persistent data objects comprising all data needed for execution of the application, the persistent data objects being linked to the persistent code objects and being configured to be executed by respective ones of the persistent code objects; and persistent configuration data objects configured to record a state of the application;

said persistent code objects, said persistent data objects, and said persistent configuration data objects being stored in a single persistent executable file on said storage medium.

26. The self-contained, computer executable application of claim 25, wherein the persistent configuration data objects further comprise persistent customization data objects configured to customize the application.

27. The self-contained, computer executable application of claim 25, wherein the persistent configuration data objects further include persistent security manager data objects configured to associate a security manager to the application.

* * * * *

UNITED STATES PATENT AND TRADEMARK OFFICE
CERTIFICATE OF CORRECTION

PATENT NO. : 5,911,071
DATED      : June 8, 1999
INVENTOR(S): Michael J. Jordan

It is certified that error appears in the above-indentified patent and that said Letters Patent is hereby corrected as shown below:

Title Page, Line 3, change "containing" to --contained--.
Claim 13, Column 6, Line 3, change "11" to --10--.

Signed and Sealed this

Fourth Day of January, 2000

Attest:

Attesting Officer

Acting Commissioner of Patents and Trademarks